(No Model.) 3 Sheets—Sheet 1.

T. R. ALMOND.
ROTARY ENGINE.

No. 418,665. Patented Jan. 7, 1890.

WITNESSES:
Gustave Dieterich
William Goebel

INVENTOR
Thomas R. Almond
BY Briesen, Steele & Knauth
ATTORNEYS.

(No Model.)  3 Sheets—Sheet 2.

T. R. ALMOND.
ROTARY ENGINE.

No. 418,665. Patented Jan. 7, 1890.

WITNESSES:
Gustave Dieterich
William Goebel

INVENTOR
Thomas R Almond
BY Briesen, Steele & Knauth
ATTORNEYS.

(No Model.) 3 Sheets—Sheet 3.
T. R. ALMOND.
ROTARY ENGINE.
No. 418,665. Patented Jan. 7, 1890.
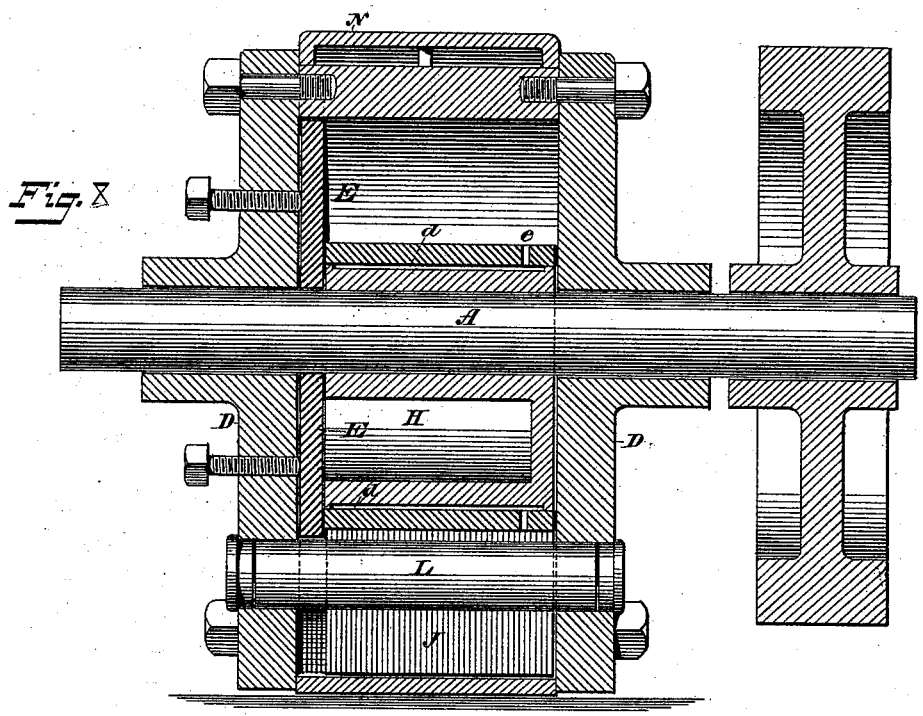
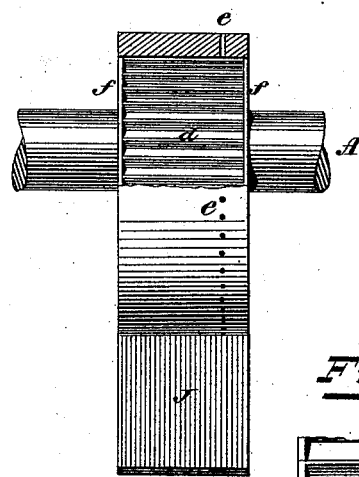
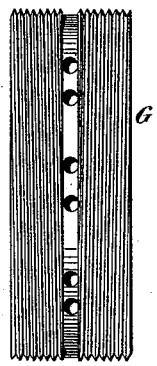
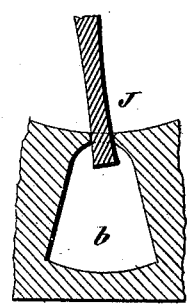
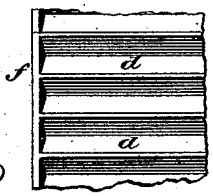
WITNESSES:
Gustave Dieterich
William Goebel
INVENTOR
Thomas R Almond
BY Briesen, Steele, Knauth
ATTORNEYS

UNITED STATES PATENT OFFICE.

THOMAS R. ALMOND, OF NEW YORK, N. Y.

ROTARY ENGINE.

SPECIFICATION forming part of Letters Patent No. 418,665, dated January 7, 1890.

Application filed March 12, 1889. Serial No. 302,986. (No model.)

*To all whom it may concern:*

Be it known that I, THOMAS RICHARD ALMOND, of the city, county, and State of New York, have invented certain new and useful Improvements in Rotary Engines, reference being had to the accompanying drawings, forming part of this specification, in which—

Figure 1:
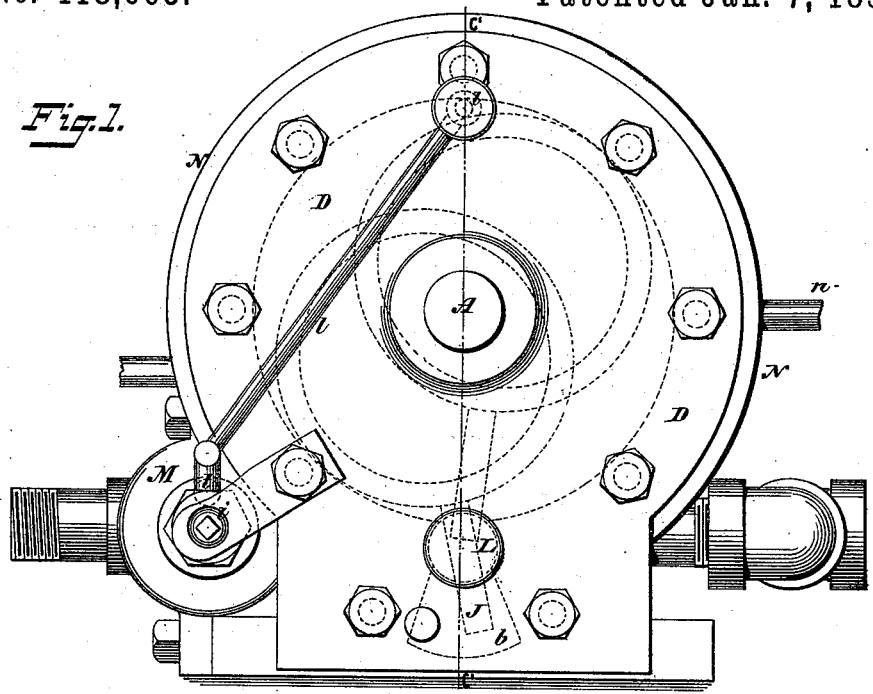
Figure 2:
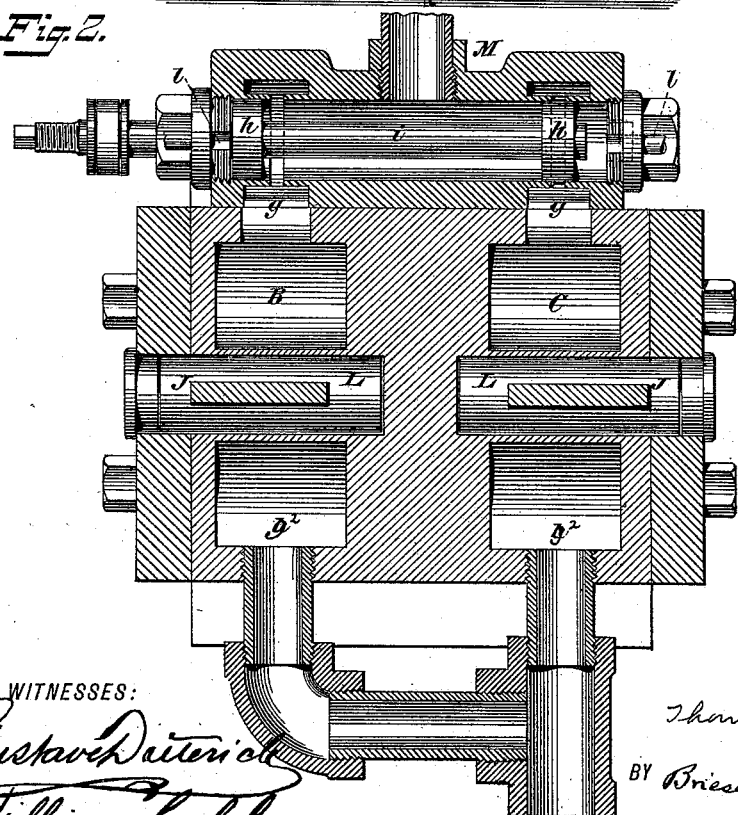
Figure 3:
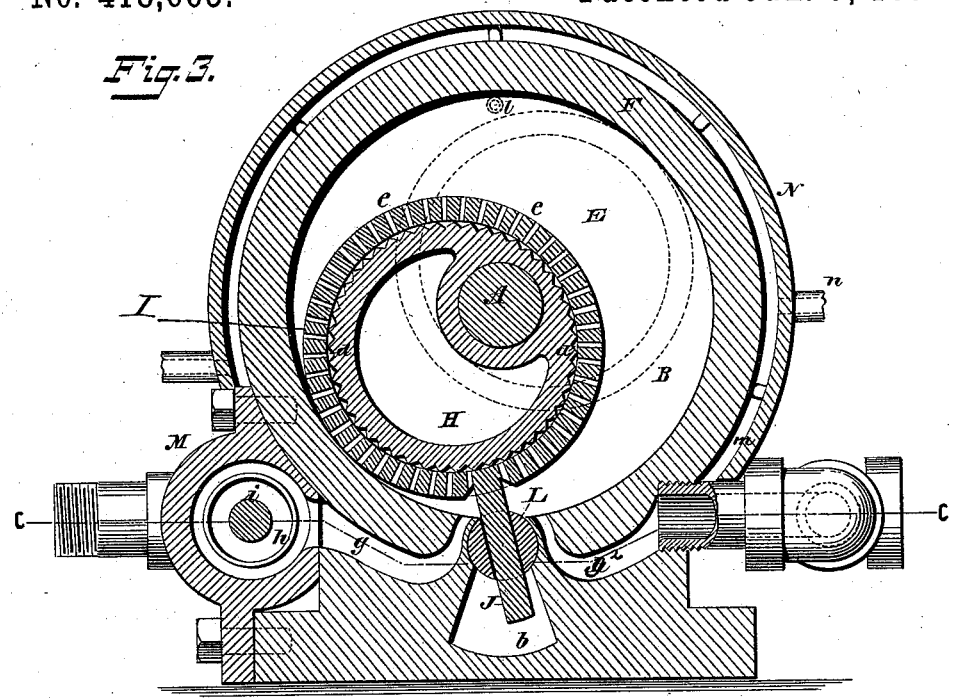
Figure 4:
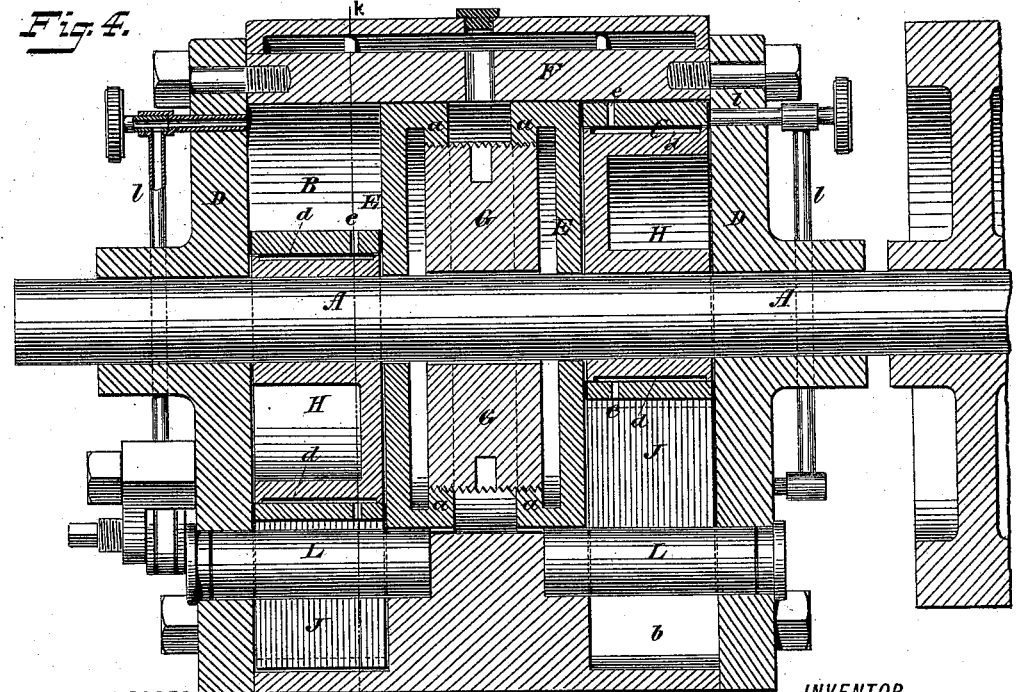

Figure 1 is an end elevation of my improved rotary engine. Fig. 2 is a horizontal section of the same, the line $c\ c$, Fig. 3, indicating the plane of section. Fig. 3 is a vertical section on the line $k\ k$, Fig. 4. Fig. 4 is a longitudinal vertical central section on the line $c'\ c'$, Fig. 1. Figs. 5, 6, 7, and 9 are detail views of parts of the engine hereinafter more fully referred to; and Fig. 8 is a vertical central section of a single engine containing my improvements. Those shown in the other figures have double engines.

Like letters refer to like parts in all the figures.

Rotary engines having eccentrics or cranks mounted upon the main shaft are subject to numerous objections of a practical nature which have prevented their universal adoption. Thus, for example, the ends of the eccentrics are liable to produce rough or grooved surfaces by their contact with the cylinder-heads, owing to the perfect steam-tight connection required, and because the surfaces move upon one another in the same continuous path. Those parts of the eccentric which are farthest removed from the shaft tend to wear the cylinder-heads more rapidly on account of their greater velocity, thus producing after a short run depressions which render the preservation of a steam-tight joint impossible.

Many other objections not necessary here to state are cited against rotary engines, all of which it is the object of my invention to overcome. In fact, my invention has been subjected to practical and most satisfactory tests, and for that reason I deem myself justified in stating that it overcomes all practical objections that can be raised to the introduction of a rotary engine.

The invention consists in the details of improvement and combination of parts which will be more fully hereinafter set forth, and specifically pointed out in the claims.

In the accompanying drawings, the letter A represents the main shaft of the engine.

B and C, Figs. 2 and 4, are the two cylinders of a double engine, which are traversed by the same shaft A.

D D are the two outer cylinder-heads, and E E are the two inner cylinder-heads.

F is the cylinder-shell or circumferential wall, which may be a single shell for two or more such cylinders, or may be a separate shell for each cylinder. Thus Fig. 8 shows a single cylinder, while Figs. 2 and 4 represent double cylinders.

For the purpose of giving to each of the cylinders B C the exact length required, I propose to make one cylinder-head E E in each adjustable. To this end one mode of accomplishing the object is represented in Fig. 4, and shows a disk G carried between the cylinder-heads E E and loosely traversed by the shaft A. The disk G has right and left hand screw-threads on its circumference, as is more clearly shown in Fig. 6, which is a side view of said disk, and these threads engage with threaded lips $a$ of the cylinder-heads E, so that turning the disk G the cylinder-heads will be moved nearer together or farther apart, as may be desired. The disk G may be turned by a wrench or other suitable instrument, and has apertures or projections for receiving such a wrench, as is indicated in the drawings.

Within each cylinder B C the shaft A carries an eccentric H, which is surrounded by a ring I. The diameter of this ring is such that at one part of its circumference it will always contact the inner wall of the cylinder-shell F. The ring I carries an abutment J, which passes into a well $b$ through a swiveled block L, that has its bearings in the body of the cylinder. Instead of this swiveled block L, the abutment may pass from the cylinder into the well $b$ through a properly-contracted opening, as in Fig. 9, that fits the abutment between the cylinder and the well $b$. The ring I within the cylinder B (or C) is provided with numerous radial apertures, each of which is aligned with one of a series of channels or flutes $d$, that are formed in the outer edge of the eccentric H. Figs. 5 and 7 are intended to represent these flutes more clearly—that is to say, the outer circumference of the eccentric H has each flute or channel $d$ in line with one of the openings $e$ of the ring I; but each flute is contained between flanges $f$ at the faces of the eccentric, as shown, so that each opening $e$ is the means of communication between the inner chamber of the cylinder B (or C) and one of the fluted chambers $d$ on the exterior of the eccentric H, the flanges $f$ and the ridges between the flutes $d$ fitting the inner circumference of the ring I so nicely as to practically prevent the escape of steam or other fluid from the flute-chambers; but the flanges $f$ and flutes $d$, instead of being formed on the eccentric, may be formed on the ring I, and said flanges may be made to lap over part of the sides of the ring or eccentric, if desired. Each cylinder is near the well $b$, into which the abutment J is adapted to dip, provided with an entrance-port $g$, and on the opposite side with a discharge or exhaust port $g^2$. The inlet-ports $g$ of the two cylinders B C communicate with a steam-chest M, within which is a double plunger $h\ h$, connected by a rod $i$. The two plungers $h$ are at such a distance from one another that whenever one of the ports $g$ is left open by one of the plungers the other plunger closes the other port $g$. (See Fig. 2.) A pipe $l$ connects each end of the steam-chest M with the corresponding cylinder at a point preferably opposite to the well $b$.

In order, now, to give a general idea of the operation of this engine, I will state, first, that when two cylinders are used on the same shaft, each with an eccentric H, ring I, and abutment J, the eccentrics are placed to project in opposite directions from said shaft, as indicated by dotted lines in Fig. 1. We will assume that Fig. 3 shows the cylinder B in its starting position, the inlet-port for that cylinder being open and that for the cylinder C being closed, as in Fig. 2. As the steam or other fluid enters the cylinder B by the open port $g$, it will begin to act upon the eccentric through the ring I, and also against what is exposed to its contact of the abutment J, and will thus gradually carry the eccentric, with its ring I, from the position shown by full lines in Fig. 3 into the position shown by dotted lines. While the live steam (if steam is used) thus acts on the eccentric and ring the connection $l$ communicates with the exhaust side of the cylinder; but the moment the eccentric, with its ring, has passed the opening $l$ by attaining the position shown by dotted lines in Fig. 3 live steam will enter through the opening and conduit $l$ into one end of the steam-chest M, and will push both plungers $h$ into such a position as to shut the inlet $g$ of the cylinder B and open that of the cylinder C, whereupon the live steam will act in the cylinder C in the manner already described with reference to cylinder B, while in the cylinder B the steam will act expansively only. Of course the opening or conduit $l$ may be placed wherever desired to allow a greater or less extent of play for actual pressure of live steam or a less or greater extent of play for the steam expansively. The plungers $h\ h$ are therefore of use only in case the steam is to be used expansively.

Thus far I have merely described the operation of the apparatus without regard to the apertures $e$ and flutes $d$, and I here desire to state that said apertures and flutes are not absolutely necessary to the first part of my invention. As far as the steam-chest M, with its plungers $h$, is concerned, any other steam-chest or means of supplying steam may be used. I do not confine myself to that shown, nor is it always necessary to use a steam-chest. For instance, in Fig. 8 is shown a single engine which will operate successfully with steam, water, or other fluid without any valve for regulating the inlet.

For a more perfect understanding of the remainder of my invention, I will now refer to the openings $e$ in the ring I, to their function, and to the operation of said ring. Through the openings $e$ steam is admitted into the chambers $d$ or flutings that are formed between the ring and eccentric, and the columns of steam thus introduced between the ring and the eccentric will exert nearly the same amount of pressure against the inner side of the ring which is exerted against the outer side thereof; hence the ring I by this arrangement is nearly balanced on the eccentric and free to perform its own peculiar motion without undue frictional contact with the eccentric. I deem it a very important part of my invention to have provided means for practically balancing this ring on the eccentric, for otherwise the pressure of the steam against the outer circumference of the ring would produce considerable friction; but by balancing the ring and getting steam between it and the eccentric I obviate these frictional difficulties. At the same time it will be clear that the steam-pressure applied to the abutment assists in causing rotation of the shaft A. Then, again, it will be observed that during the revolution of the shaft the motion of the eccentric H is entirely different from the motion of the surrounding ring I. In fact, in my engine it is not necessary nor intended that the eccentrics shall contact the cylinder-heads, excepting, perhaps, right near the circumference of the shaft.

The ring I, which embraces the eccentric, forms the steam-tight joint between the cylinder-heads, and is slightly longer than the eccentric, so that it shall be in contact with the cylinder-heads while the eccentric is out of contact therewith. The path of this ring when in motion is of a character very different from that of the eccentric, as it travels over the face of the cylinder-head, owing to its connection with the abutment and with the eccentric, in the peculiar motion such as would be used by a person polishing a plate, and this motion does make the ring polish the cylinder-heads and keep them flat and straight, where the mere motion of a steam-tight eccentric would be apt to wear depressions in them. The contact-surfaces between the cylinder-heads and the ring I should be as free from lateral pressure as possible, and as the ring I in my engine is practically balanced, as already described, and under very little pressure the joined surfaces will not rub together laterally to any objectionable extent. Thus the rings I in my engine form the steam or water tight joint, and also carry the abutment, and this abutment in my engine is a work-producing element during the best part of the steam action, because when fully exposed to steam-pressure it transmits such pressure by the ring to the eccentric, and thus helps to turn the shaft.

Instead of admitting steam between the ring and eccentric through apertures in the ring, it may be admitted by other means which will readily occur to the skilled mechanic. As to the adjustable heads E E, the best form of adjustable head will be a plate in contact with screw-points in the cylinder-head, as in Fig. 8. The ring G, with the right-and-left-hand screw adapted to move both cylinder-heads at the same time in opposite directions, is not quite as satisfactory for large engines as if the cylinder-heads were adjustable independently of one another.

I have already stated that the block L, through which the abutment passes, is not absolutely necessary to the successful operation of my engine. Any device which will hold the ring I so that it cannot revolve with the eccentric, and which at the same time will form the necessary joint and partition, will satisfy the same end.

In order to avoid any uneven heating of the engine at the start and an unequal expansion of parts resulting therefrom, I prefer to surround each cylinder with a jacket N, so as to form a space $m$ on the outer side of the cylinder, into which steam may be introduced through a pipe $n$ for preheating the cylinder before starting the engine.

Having now described my invention, what I claim is—

1. The continuously-straight shaft A, carrying tubular eccentric H, combined with the cylinder B, and with the ring I, surrounding said eccentric, said ring being supported near its ends by said eccentric, and being slightly longer than the same, the heads of the cylinder being at a distance apart greater than the length of the eccentric, whereby the eccentric will be out of contact with the cylinder-heads, while the ring I is wholly in contact therewith, substantially as and for the purpose described.

2. In a rotary engine, the combination of two cylinders B C with the shaft A, eccentrics H, rings I, having abutments J, steam-conduits $l$, and steam-chest M, having the movable plungers or valves $h$, all arranged for joint operation, as specified.

3. In a rotary engine, the main shaft and the eccentric H on the main shaft, combined with the ring I, surrounding said eccentric, one of said parts being perforated to admit steam between said ring and said eccentric, as specified.

4. In a rotary engine, the eccentric H, combined with the shaft A to be driven with the cylinder B, and with the surrounding ring I, having abutment J, the ring being perforated to admit steam between the eccentric and the ring, as specified.

5. The eccentric H, having flutes or chambers $d$ and flanges $f$, combined with the surrounding ring I, having apertures $e$, aligned with chambers $d$, respectively, and with the surrounding cylinder B, as described.

6. In a rotary engine, the balanced ring I and abutment J, placed around an eccentric of the shaft A and within the cylinder B, all arranged so that the working-power of the steam or other fluid admitted to the engine shall be exerted upon said eccentric through said balanced ring and abutment, as specified.

THOMAS R. ALMOND.

Witnesses:
HARRY M. TURK,
C. A. DIETERICH.